(12) United States Patent
Ferguson et al.

(10) Patent No.: US 10,688,669 B2
(45) Date of Patent: Jun. 23, 2020

(54) WIRELESS QUICK CHANGE END EFFECTOR SYSTEM FOR USE WITH A ROBOT

(71) Applicant: Fetch Robotics, Inc., San Jose, CA (US)

(72) Inventors: Michael Ferguson, Mountain View, CA (US); Mark Medonis, San Jose, CA (US)

(73) Assignee: Fetch Robotics, Inc., San Jose, CA (US)

(*) Notice: Subject to any disclaimer, the term of this patent is extended or adjusted under 35 U.S.C. 154(b) by 844 days.

(21) Appl. No.: 14/929,185

(22) Filed: Oct. 30, 2015

(65) Prior Publication Data

US 2017/0120454 A1    May 4, 2017

(51) Int. Cl.
| | |
|---|---|
| B25J 15/04 | (2006.01) |
| H04B 5/00 | (2006.01) |
| B25J 19/00 | (2006.01) |
| B25J 9/08 | (2006.01) |
| B25J 15/00 | (2006.01) |

(52) U.S. Cl.
CPC .......... B25J 15/0441 (2013.01); B25J 9/08 (2013.01); B25J 15/0061 (2013.01); B25J 15/0466 (2013.01); B25J 19/0045 (2013.01); H04B 5/0037 (2013.01); Y10S 901/14 (2013.01); Y10S 901/16 (2013.01); Y10S 901/30 (2013.01); Y10S 901/39 (2013.01); Y10S 901/41 (2013.01); Y10S 901/42 (2013.01); Y10S 901/43 (2013.01)

(58) Field of Classification Search
CPC ............................... B25J 15/0061; B25J 9/08
See application file for complete search history.

(56) References Cited

U.S. PATENT DOCUMENTS

| | | | | |
|---|---|---|---|---|
| 5,449,211 A * | 9/1995 | Monford, Jr. | ............ | B25J 15/04 294/65.5 |
| 6,847,181 B2 * | 1/2005 | Brooks | .................. | B25J 19/063 901/49 |
| 9,937,628 B2 * | 4/2018 | Werner | ................. | B25J 19/063 |
| 9,987,711 B2 * | 6/2018 | Jesser | ..................... | F23D 14/52 |
| 2015/0234398 A1 * | 8/2015 | Harris | ........................ | B25J 5/00 700/250 |

FOREIGN PATENT DOCUMENTS

DE    102013111938 B3 * 11/2014
SU       1556896 A  *  4/1990

* cited by examiner

*Primary Examiner* — Gerald McClain
(74) *Attorney, Agent, or Firm* — J. Steven Svoboda

(57) ABSTRACT

A quick change end effector system for use with a robot includes: a quick change end effector configured for application to a task to be completed by a robot, the quick change end effector further comprising an end effector magnet; and a robotic manipulator configured to lock to the end effector, the robotic manipulator further configured to use the end effector to complete the task, the robotic manipulator comprising a manipulator magnet, the manipulator magnet being configured to magnetically attract the end effector magnet, thereby locking the manipulator in a mechanically strong connection to the quick change end effector, wherein upon disengagement of the magnetic attraction locking the manipulator to the quick change end effector, the quick change end effector can be quickly removed from the manipulator.

11 Claims, 3 Drawing Sheets

WIRELESS QUICK CHANGE END EFFECTOR SYSTEM FOR USE WITH A ROBOT

PRIORITY CLAIM

The present application claims the priority benefit of U.S. provisional patent application No. 62/119,085 filed Feb. 20, 2015 and entitled "Wireless Quick Change End Effector System for Use with a Robot," the disclosure of which is incorporated herein by reference.

SUMMARY

Embodiments of the invention relate in general to a system for use with a robot comprising a quick change end effector and a robotic manipulator. More specifically, embodiments of the invention relate to a system for use with a robot comprising a wireless quick change end effector and a robotic manipulator.

A quick change end effector system for use with a robot includes: a quick change end effector configured for application to a task to be completed by a robot, the quick change end effector comprising a tool configured to perform a robotic task, the quick change end effector further comprising an end effector magnet; and a robotic manipulator configured to lock to the end effector, the robotic manipulator further configured to use the end effector to complete the task, the robotic manipulator comprising a manipulator magnet, the manipulator magnet being configured to magnetically attract the end effector magnet, thereby locking the manipulator in a mechanically strong connection to the quick change end effector, wherein upon disengagement of the magnetic attraction locking the manipulator to the quick change end effector, the quick change end effector can be quickly removed from the manipulator.

A quick change end effector system for use with a robot includes: a quick change end effector configured for application to a task to be completed by a robot, the quick change end effector comprising a tool configured to perform a robotic task, the quick change end effector further comprising an end effector magnet; a robotic manipulator configured to lock to the end effector, the robotic manipulator further configured to use the end effector to complete the task, the robotic manipulator comprising a manipulator magnet that is free to rotate relative to the manipulator, the manipulator further comprising an actuator configured to rotate the manipulator magnet, the manipulator magnet being configured to magnetically attract the end effector magnet, thereby locking the manipulator in a mechanically strong connection to the quick change end effector when the manipulator magnet is in a locked position, thereby fixing one or more of a position and an orientation of the quick change end effector relative to the manipulator, the manipulator magnet being free to rotate between the locked position and an unlocked position, when the manipulator magnet is in the unlocked position, the quick change end effector and the manipulator magnet having no substantial magnetic attraction, and the quick change end effector can be quickly, cleanly and efficiently removed from the manipulator without the involvement of a human being, the manipulator further comprising a wireless power transmitter, the quick change end effector further comprising a wireless power receiver configured to receive power sent by the power transmitter; and a wireless communications element configured to communicate with the end effector.

A quick change end effector system for use with a robot includes: a quick change end effector configured for application to a task to be completed by a robot, the quick change end effector comprising a tool configured to perform the robotic task, the quick change end effector further comprising an end effector magnet; a robotic manipulator configured to lock to the end effector, the robotic manipulator further configured to use the end effector to complete the task, the robotic manipulator comprising a manipulator magnet that is not free to move relative to the manipulator, the manipulator magnet being configured to magnetically attract the end effector magnet, thereby locking the manipulator into a mechanically strong connection with the quick change end effector, when the manipulator magnet is not in the proximity of the end effector magnet, the quick change end effector and the manipulator magnet having no substantial magnetic attraction, and the quick change end effector can be quickly, cleanly and efficiently removed from the manipulator without the involvement of a human being, the manipulator further comprising a wireless power transmitter, the quick change end effector further comprising a wireless power receiver configured to receive power sent by the power transmitter, the manipulator further comprises a manipulator sensor, and the quick change end effector further comprises an end effector sensor, the manipulator sensor and the end effector sensor being configured to sense their mutual distance from each other, so as to ensure proper locking of the quick change end effector into the mechanically strong connection with the manipulator by ensuring that the distance between the manipulator sensor and the end effector sensor is minimized; and a wireless communications element configured to communicate with the end effector.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1A:
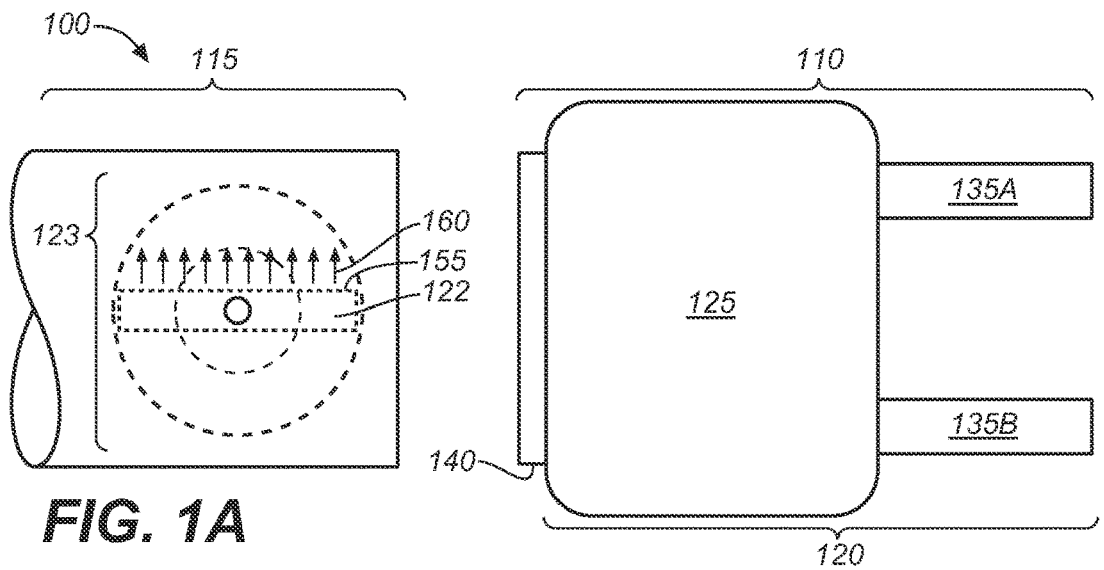
FIGS. 1A-1C are a set of pictures depicting a system comprising a quick change end effector and a robotic manipulator comprising a manipulator magnet that is free to move relative to the manipulator.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and the details of certain components can be altered without substantially impairing the functioning of the invention. It is intended, therefore, that the subject matter in the above description shall be interpreted as illustrative and shall not be interpreted in a limiting sense.

Embodiments of the invention relate in general to a system for use with a robot comprising a quick change end effector and a robotic manipulator. More specifically, embodiments of the invention relate to a system for use with a robot comprising a wireless quick change end effector and a robotic manipulator.

Other embodiments of the invention relate generally to a system for use with a robot for performing one of more of communicating with and powering a quick change end effector. Further embodiments of the invention relate generally to a system for use with a robot for performing one of more of wirelessly communicating with and wirelessly powering a quick change end effector.

According to additional embodiments of the invention, the manipulator comprises one or more manipulator magnets. According to further embodiments of the invention, the quick change end effector is attached to the manipulator using one or more of the one or more manipulator magnets.

According to other embodiments of the invention, the manipulator further comprises an actuator configured to move one or more of the one or more manipulator magnets. For example, the actuator comprises an electric actuator. For example, the movement of the one or more manipulator magnets comprises one or more of rotation, retraction, and another movement.

According to further embodiments of the invention, the manipulator comprises a manipulator magnet that is not free to move relative to the manipulator. For example, the manipulator comprises a manipulator magnet is not free to rotate relative to the manipulator. According to yet other embodiments of the invention, the manipulator comprises a manipulator magnet that is free to move relative to the manipulator. For example, the manipulator comprises a manipulator magnet that is free to rotate relative to the manipulator. For example, the manipulator magnet has a locked position and an unlocked position. For example, the manipulator magnet is free to rotate between the locked position and the unlocked position. For example, when the manipulator magnet is in the locked position, the end effector magnet is locked by magnetic attraction to the manipulator magnet. For example, when the manipulator magnet is in the unlocked position, the magnetic attraction is disengaged between the quick change end effector magnet and the manipulator magnet, and the quick change end effector can be quickly removed from the manipulator. For example, the locked position and the unlocked position may be separated by approximately ninety (90) degrees. For example, the quick change end effector may be held in one or more of a cup and an edge to avoid movement of the quick change end effector against a face of the manipulator.

According to further embodiments of the invention, the system further comprises a communications element configured to communicate with the quick change end effector. For example, the communications element may be configured to transmit data to the quick change end effector. For example, the communications element may be configured to receive data from the quick change end effector. For example, the communications element may comprise a wireless communications element. For example, the communications element may be configured to operate using Infrared Data Association (IrDA) wireless communications. For example, the communications element may be configured to operate using one or more of Bluetooth, Institute of Electrical and Electronics Engineers (IEEE) 802.11 specifications, IEEE 802.15.4 specifications including one or more of the Zigbee open standard and the WirelessHART open standard, and another wireless communications protocol.

For example, the communications element is comprised elsewhere in the robot. For example, the communications element is comprised in a robotic control system. For example, the communications element is comprised in a robotic control system located internally to the robot. For example, the communications element is comprised in a robotic control system located externally to the robot.

According to other embodiments of the invention, the system further comprises a power transmitter configured to power the quick change end effector. For example, the power transmitter may be a wireless power transmitter.

According to still further embodiments of the invention, the power transmitter uses resonant power transfer. For example, a power transmitter located near the end of the manipulator inductively energizes a power receiver within the quick change end effector, thus transferring power to the quick change end effector. According to alternative embodiments of the invention, the power transmitter uses inductive power transfer. According to still further embodiments of the invention, the power transmitter uses one or more of resonant power transfer and inductive power transfer. For example, a power transmitter located near the end of the manipulator transfers energy to a power receiver comprised in the quick change end effector. This energy transfer provides operational power to the quick change end effector.

According to further embodiments of the invention, the quick change end effector comprises one or more of a battery, a capacitor and another charge holding device configured to hold a charge. According to further embodiments of the invention, the quick change end effector may be attached to a robotic base. For example, the quick change end effector may be attached to a mobile robotic base.

According to still other embodiments of the invention, the quick change end effector further comprises a charging device. According to yet other embodiments of the invention, the charging device is configured to charge the charge holding device when the quick change end effector requires less power than is provided by the power transmitter. For example, the charge holding device, for example, the battery, may charge up so as to be able to provide bursts of additional power above the limits of the power transmitter.

According to further embodiments of the invention, the manipulator may be attached to a robotic base. For example, the manipulator may be attached to a mobile robotic base.

According to yet other embodiments of the invention, the quick change end effector may be selectable from a plurality of candidate quick change end effectors. For example, the robotic base may comprise one or more candidate quick change end effectors. For example, a candidate quick change end effector holder can comprise one or more of the candidate quick change end effectors. For example, the candidate quick change end effector holder can comprise a candidate quick change end effector rack. For example, the candidate quick change end effector holder can be mounted on a robot. For example, the candidate quick change end effector holder can be mounted on the base of a robot. For example, the candidate quick change end effector holder can be mounted on the mobile robotic base.

According to still other embodiments of the invention, the manipulator comprises one or more of a Cartesian manipulator, a trapezoidal manipulator, and another type of manipulator. For example, a limb comprises the manipulator, the limb further comprising one or more joints that can be individually controlled. For example, at least one of the limbs that comprises one or more individually controlled joints may be configured to facilitate dexterous manipulation of the limb. For example, the limb comprises one or more of an arm, a leg, and another limb.

According to other embodiments of the invention, the manipulator may comprise a robotic base. For example, the manipulator comprises a mobile robotic base. For example, the manipulator comprises the mobile robotic base and further comprises a joint. For example, the joint is configured to perform one or more of levering the quick change end effector away from the ground plane and lifting the quick change end effector away from the ground plane so that the gripped object does not touch the ground. Such embodiments may be useful for applications such as, for example, harvest automation in which the tool comprises a harvest automation device.

According to an alternative set of embodiments, the mobile robotic base may not be constrained to the ground plane. For example, the mobile robotic base may fly. For example, the mobile robotic base may fly using one or more propellers. According to another set of embodiments, the manipulator may not be constrained to the ground plane. For example, the manipulator may fly. For example, the manipulator may fly using one or more propellers.

Figure 1B:
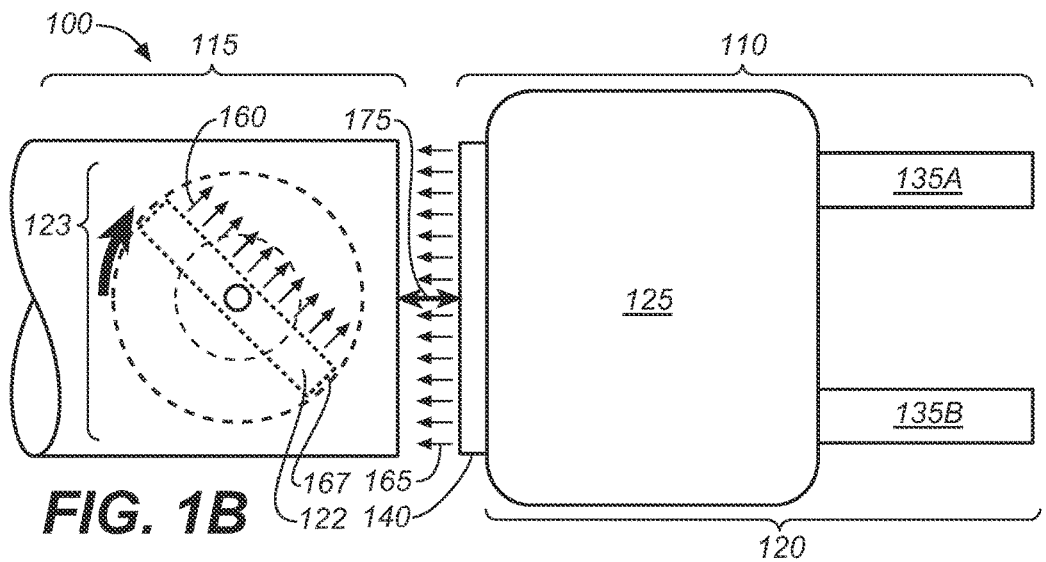
Figure 1C:
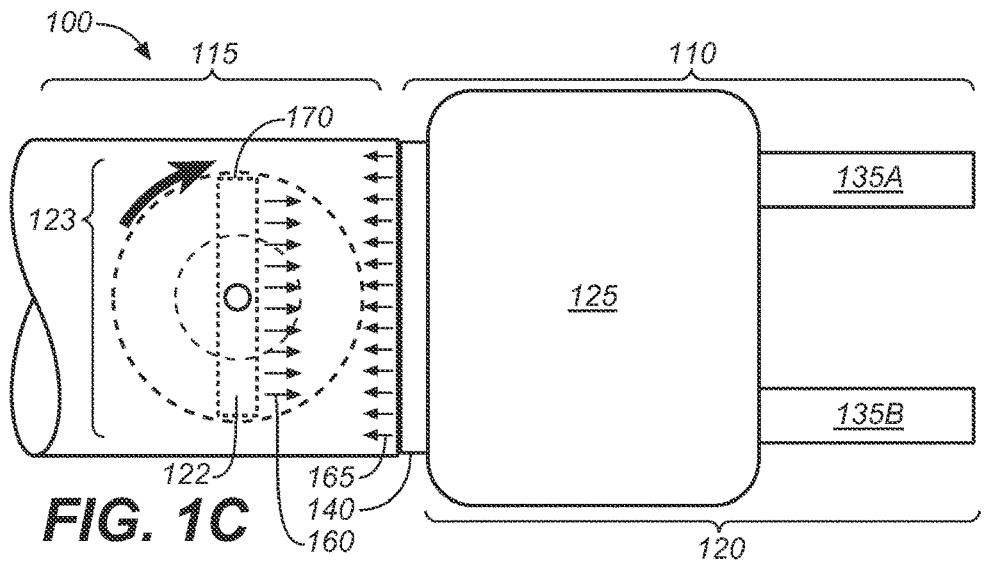

FIGS. 1A-1C are a set of pictures depicting a system 100 comprising a quick change end effector 110 and a robotic manipulator 115. The manipulator 115 locks to the end effector 110 and uses the end effector 110 to complete a robotic task. For example, the manipulator 115 locks to the end effector 110 and uses the end effector 110 to manipulate an object (not shown). For example, the robotic manipulator 115 comprises a robotic limb 115. For example, the robotic manipulator 115 comprises one or more of a robotic arm 115, a robotic leg 115, and another robotic limb 115. For example, the robotic limb 115 comprises one or more joints (not shown) that can be individually controlled. For example, at least one of the limbs 115 that comprises one or more individually controlled joints (not shown) may be configured to facilitate dexterous manipulation of the limb.

The quick change end effector 110 comprises a tool 120 configured to perform a robotic task. For example, the task is assigned by a controller (not shown) of the system 100. For example, the robpt self-assigns its own task. For example, the task is determined in another way. For example, the manipulator 115 comprises a Cartesian manipulator. For example, the manipulator 115 comprises a trapezoidal manipulator.

The manipulator 115 comprises a manipulator magnet 122 that is free to move relative to the manipulator 115. In this example, the manipulator comprises a manipulator magnet 122 that is free to rotate relative to the manipulator 115. As shown in FIGS. 1A-1C, the manipulator 115 comprises a magnet assembly 123.

FIG. 1A is a picture depicting the system 100 comprising a quick change end effector 110 and the manipulator 115, where the manipulator 115 comprises the manipulator magnet 122 that is free to move relative to the manipulator 115. For example, as shown in FIG. 1A, the tool 120 comprises a gripper 120 configured to grasp one or more objects (not shown) pursuant to the robotic task. Grippers are manufactured by, for example, Robotiq of Lévis, Quebec, Canada (www.robotiq.com). Alternatively, or additionally, the tool 120 comprises one or more of a paint gun, a welding torch, a cutter, a pair of scissors, a glue gun, a stapler, a gripper, and another tool.

As shown in FIG. 1A, the gripper 120 comprises a gripper body 125 and fingers 135A and 135B. Alternatively, the gripper 120 comprises a number of fingers other than two. For example, the gripper 120 comprises one finger. For example, the gripper 120 comprises three fingers. One or more of the fingers may be articulated, so that one or more of the one or more fingers comprises one or more joints. One or more of the fingers may be one or more of soft, deformable, and shapeable. For example, one or more of the fingers may be shapeable using one or more of electrical currents, air, and another shaping method. Alternatively, or additionally, instead of the fingers 135A and 135B, the gripper 120 comprises one or more of a hook, a magnet, a vacuum cup, a suction device, a soft adaptive finger device, and another gripping device.

The gripper body 125 comprises one or more motors (not shown) and other hardware and software as needed to ensure the proper functioning of the gripper 120.

One or more of the gripper fingers 135A and 135B may be articulated, so that one or more of the one or more gripper fingers 135A and 135B comprises one or more joints (not shown). One or more of the gripper fingers 135A and 135B may comprise one or more of a hook (not shown), a magnet (not shown), a vacuum cup (not shown), and another gripping device (not shown). The quick change end effector 110 further comprises an end effector magnet 140.

The manipulator 115 comprises a manipulator magnet 122 having an unlocked position 155. As shown in FIG. 1A, when in the unlocked position 155, the manipulator magnet 122 is facing approximately ninety (90) degrees away from the end effector magnet 140. Consequently, a manipulator magnetic attraction 160 exerted by the manipulator magnet 122 has no substantial effect on the end effector magnet 140. Similarly, an end effector magnetic attraction 165 exerted by the end effector magnet 140 has no substantial effect on the manipulator magnet 122.

Consequently, when the manipulator magnet 122 is in its unlocked position 155, the magnetic attraction between the manipulator magnet 122 and the end effector magnet 140 is disengaged, and the quick change end effector 110 can be quickly removed from the manipulator 115, facilitating a quick change to one or more of a different manipulator 115 and a different quick change end effector 110.

The manipulator magnet 122 is configured to be rotated from the unlocked position 155 through an intermediate position 167 to a locked position 170 that engages the end effector magnet 140. In the example shown in FIGS. 1A through 1C, the manipulator magnet 122 is configured to be rotated from the unlocked position 155 by at least approximately 90 degrees through an intermediate position 167 to a locked position 170 that engages the end effector magnet 140.

As shown in FIG. 1B, when the manipulator magnet 122 is rotated into the locked position 170, the manipulator magnet 122 and the end effector magnet 140 are polarized so that the manipulator magnetic attraction 160 exerted by the manipulator magnet 122 attracts the end effector magnet 140, contributing to an attractive force 175 between the end effector magnet 140 and the manipulator magnet 122. Similarly, when the manipulator magnet 122 is in the locked position 170, the end effector magnetic attraction 165 exerted by the end effector magnet 140 attracts the manipulator magnet 122, contributing to the attractive force 175 between the end effector magnet 140 and the manipulator magnet 122. The attractive force 175 between the manipulator magnet 122 and the end effector magnet 140 fixes the end effector magnet 140 in place, thereby fixing one or more of a position and an orientation of the quick change end effector 110 relative to the manipulator 115.

As shown in FIG. 1C, the attractive force 175 between the end effector magnet 140 and the manipulator magnet 122 that was created when the manipulator magnet 122 was rotated into the locked position 170 fixes the end effector magnet 140 in place, thereby fixing the quick change end effector 110 in place and locking it into a mechanically strong connection with the manipulator 115.

Figure 2A:
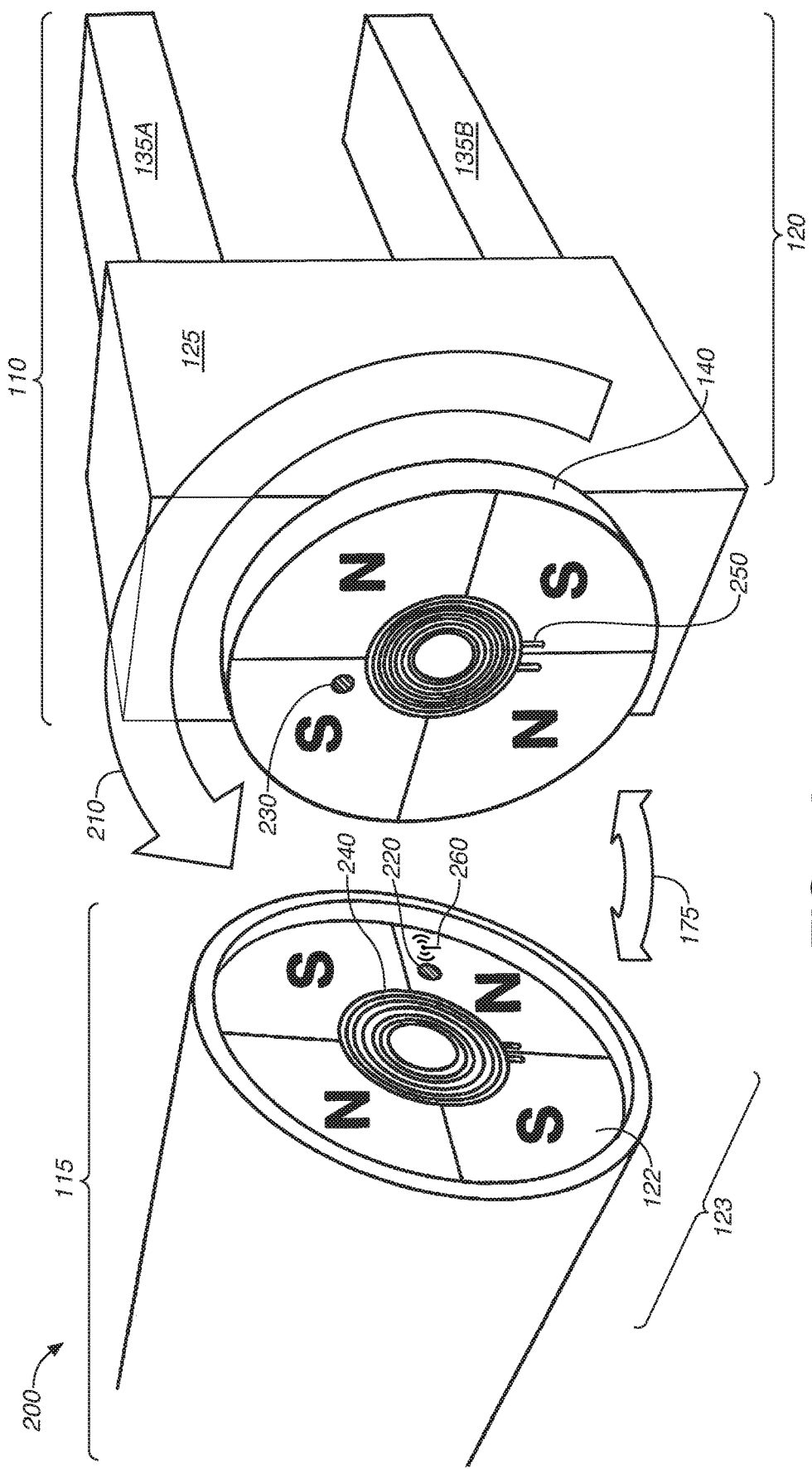
FIGS. 2A-2B are a set of pictures depicting a system comprising a quick change end effector and a robotic manipulator comprising a manipulator magnet that is not free to move relative to the manipulator.
Figure 2B:
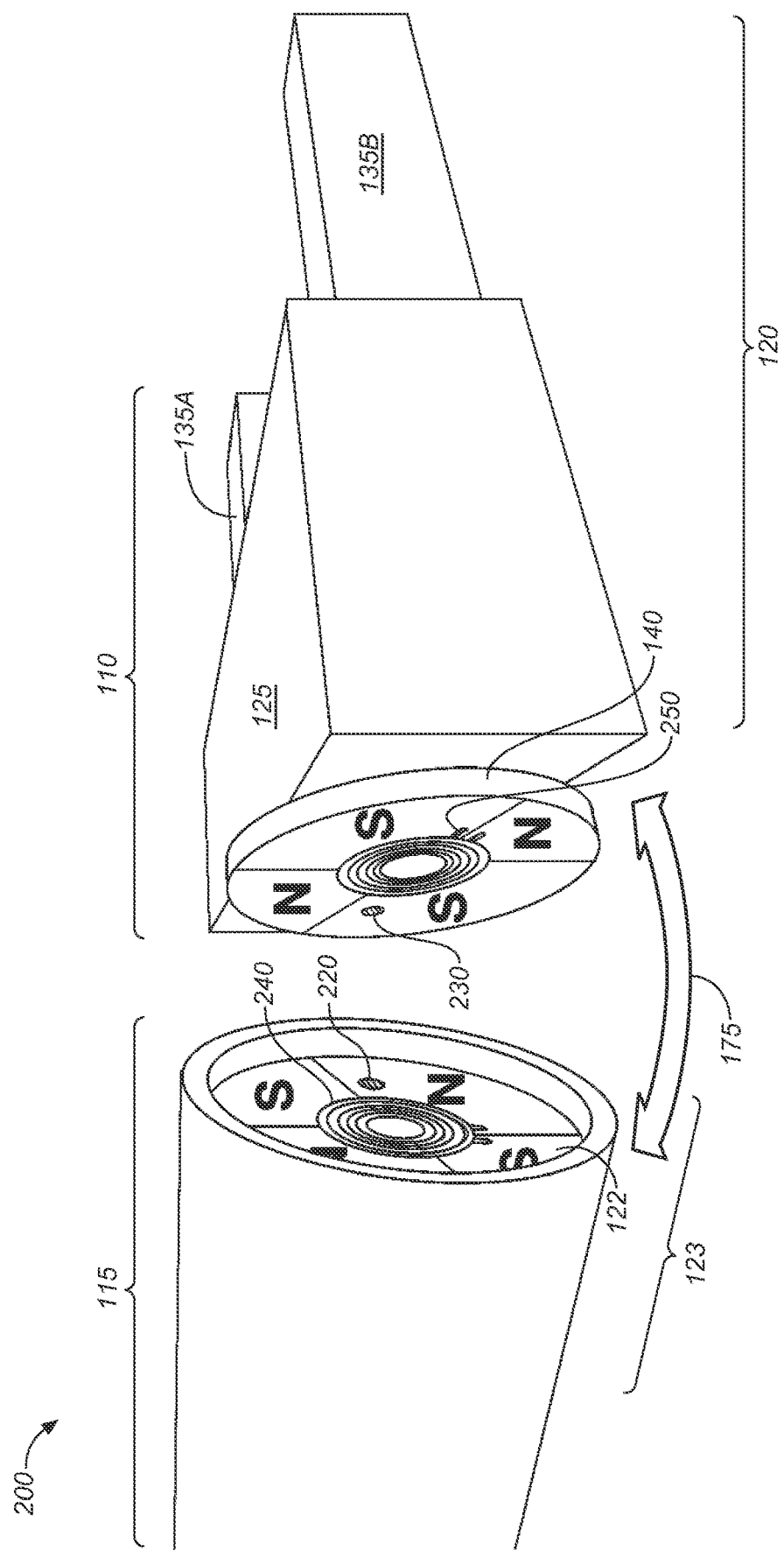

FIGS. 2A-2B are a set of pictures depicting a system 200 comprising a quick change end effector 110 and a robotic manipulator 115. The manipulator 115 again locks to the end effector 110 and uses the end effector 110 to complete a robotic task. For example, the manipulator 115 locks to the end effector 110 and uses the end effector 110 to manipulate an object (not shown).

The quick change end effector 110 again comprises a tool 120 configured to perform a robotic task. The robotic manipulator 115 is again comprised in a robot (not shown) and the manipulator 115 is again configured to manipulate the robot (not shown).

The manipulator 115 again comprises a manipulator magnet 122 that now is not free to move relative to the manipulator 115. As shown in FIGS. 2A-2B, As shown the manipulator 115 again comprises a magnet assembly 123.

FIG. 2A is a picture depicting the system 200 comprising a quick change end effector 110 and the manipulator 115, where the manipulator 115 again comprises the manipulator magnet 122 that is now not free to rotate relative to the manipulator 115. For example, as shown in FIG. 2A, the tool 120 again comprises a gripper 120 configured to grasp one or more objects (not shown) pursuant to the robotic task.

As shown in FIG. 2A, the gripper 120 again comprises a gripper body 125 and fingers 135A and 135B.

The gripper body 125 comprises one or more motors (not shown) and other hardware and software as needed to ensure the proper functioning of the gripper 120.

The quick change end effector 110 further comprises an end effector magnet 140.

The manipulator 115 comprises a manipulator magnet 122. Unlike the system shown in FIGS. 1A-1C, the manipulator magnet 122 in FIGS. 2A-2B does not move independently of the manipulator 115. When the manipulator magnet 122 is not in proximity to the end effector magnet 140, the magnetic attraction between the manipulator magnet 122 and the end effector magnet 140 is disengaged, and the quick change end effector 110 can be quickly removed from the manipulator 115, facilitating a quick change to one or more of a different manipulator 115 and a different quick change end effector 110.

As shown in FIG. 2A, the manipulator magnet 122 and the end effector magnet 140 are polarized so that as the manipulator magnet 122 and the end effector magnet 140 move into proximity to one another, a magnetic attraction grows between opposing poles of the manipulator magnet 122 and of the end effector magnet 140. In response to the magnetic attraction, if the end effector magnet 140 and the manipulator magnet 122 are not already aligned, the end effector magnet 140 rotates relative to the manipulator magnet 122, causing the end effector 110 and the manipulator 115 to rotate relative to each other. For example, as shown in FIG. 2A, the magnetic attraction causes the end effector magnet 140 and thus the end effector 110 to rotate in a counter-clockwise direction 210, in turn causing an attractive force 175 to grow between the manipulator magnet 122 and the end effector magnet 140.

As shown in FIG. 2B, the attractive force 175 between the end effector magnet 140 and the manipulator magnet 122 increases as the manipulator magnet 122 and the end effector magnet 140 move into closer proximity to each other. The attractive force 175 fixes the end effector magnet 140 in place relative to the manipulator magnet 122, thereby locking the quick change end effector 110 into a mechanically strong connection with the manipulator 115.

The manipulator 115 further comprises a manipulator sensor 220. The quick change end effector 110 further comprises an end effector sensor 230. The manipulator sensor 220 and the end effector sensor 230 are configured to sense their mutual distance from each other. The manipulator sensor 220 and the end effector sensor 230 ensure proper locking of the quick change end effector 110 into a mechanically strong connection with the manipulator 115 by ensuring that the distance between the manipulator sensor 220 and the end effector sensor 230 is minimized.

The manipulator 115 further comprises a power transmitter 240. For example, the power transmitter 240 is located near the manipulator magnet 122. Preferably, although not necessarily, the power transmitter 240 comprises a wireless power transmitter 240. The power transmitter 240 transmits power using one or more of resonant power transfer and inductive power transfer.

The quick change end effector 110 further comprises a power receiver 250. For example, the power receiver 250 is located near the end effector magnet 140. Preferably, although not necessarily, the power receiver 250 comprises a wireless power receiver 250. The power receiver receives power transmitted by the power transmitter 240. The received power provides the quick change end effector 110 with power to operate. The manipulator 115 further comprises a communications element 260 configured to communicate with the quick change end effector 110.

As shown in FIGS. 1A-1C and 2A-2B, the end effector magnet 140 and the manipulator magnet 122 may be self-aligning. The manipulator magnet 122 and the end effector magnet 140 may provide an attractive force when in the locked position. Rotating the manipulator 115 while the quick change end effector 110 is held static may cause the manipulator magnet 122 and the end effector magnet 140 to become unaligned, facilitating a quick change to one or more of another manipulator 115 and another quick change end effector 110. Rotating the manipulator 115 while the quick change end effector 110 is held static may create a repulsive force that may disengage the quick change end effector 110 from the manipulator 115, facilitating a quick change to one or more of another manipulator 115 and another quick change end effector 110.

One advantage of the invention is it facilitates a very quick change of one or more of the manipulator 115 and the quick change end effector 110. The quick change can be accomplished cleanly and efficiently and without the involvement of a human being. No human being is required, for example, to unbolt an existing connection between the manipulator 115 and the quick change end effector 110. Similarly, no human being is required to bolt a new connection between the manipulator 115 and the quick change end effector 110.

For example, it will be understood by those skilled in the art that embodiments of the invention may use other styles and types of end effectors, both currently known and still to be invented. For example, it will be understood by those skilled in the art that software used by the wireless quick change end effector for use with a robot may be located in any location in which it may be accessed by the system. It will be further understood by those of skill in the art that the number of variations of the network, the location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A quick change end effector system for use with a robot, comprising:
    a quick change end effector configured for application to a task to be completed by a robot, the quick change end effector further comprising an end effector magnet, the quick change end effector further comprising an end effector sensor, the end effector magnet comprising a permanent magnet;
    a communications element configured to communicate with the end effector;
    and a robotic manipulator configured to lock to the end effector, the robotic manipulator further configured to use the end effector to complete the task, the robotic manipulator comprising a manipulator magnet, the manipulator magnet being configured to magnetically attract the end effector magnet, thereby locking the manipulator to the quick change end effector, wherein the manipulator magnet is not free to move relative to the manipulator, the robotic manipulator further comprising a manipulator sensor, the manipulator sensor and the end effector sensor being configured to sense their mutual distance from each other, the manipulator sensor and the end effector sensor thereby ensuring locking of the quick change end effector into a-connection with the manipulator by ensuring that the distance between the manipulator sensor and the end effector sensor is minimized,
    wherein upon disengagement of the magnetic attraction locking the manipulator to the quick change end effector, the quick change end effector can be removed from the manipulator.

2. The quick change end effector system of claim 1, wherein the quick change end effector comprises a tool configured to perform the robotic task.

3. The quick change end effector system of claim 1, wherein the end effector magnet and the manipulator magnet move into proximity to each other due to their magnetic attraction to each other, thereby locking the quick change end effector into a connection with the manipulator.

4. The quick change end effector system of claim 1, wherein:
    the quick change end effector is selectable from a plurality of candidate quick change end effectors.

5. The quick change end effector system of claim 1, wherein:
    the tool comprises one or more of a paint gun, a welding torch, a cutter, a pair of scissors, a glue gun, a stapler, and a gripper.

6. The quick change end effector system of claim 1, wherein:
    the gripper comprises one or more of one or more fingers, a hook, a magnet, a vacuum cup, a suction device, and a soft adaptive finger device.

7. The quick change end effector system of claim 1, wherein:
    the manipulator comprises one or more of a Cartesian manipulator and a trapezoidal manipulator.

8. The quick change end effector system of claim 1, wherein the communications element is a wireless communications element.

9. The quick change end effector system of claim 1, wherein:
    the manipulator further comprises a power transmitter; and
    the quick change end effector further comprises a power receiver configured to receive power sent by the power transmitter.

10. The quick change end effector system of claim 9, wherein the power transmitter is a wireless power transmitter.

11. The quick change end effector system of claim 9, wherein the power receiver is a wireless power receiver.

* * * * *

UNITED STATES PATENT AND TRADEMARK OFFICE
CERTIFICATE OF CORRECTION

PATENT NO. : 10,688,669 B2
APPLICATION NO. : 14/929185
DATED : June 23, 2020
INVENTOR(S) : Ferguson et al.

Page 1 of 1

It is certified that error appears in the above-identified patent and that said Letters Patent is hereby corrected as shown below:

On the Title Page

Item (60), please add a "Related U.S. Application Data" section as follows:
"Provisional application No. 62/119,085, filed on February 20, 2015."

Signed and Sealed this
Twenty-third Day of August, 2022

Katherine Kelly Vidal
*Director of the United States Patent and Trademark Office*